(12) United States Patent
Phillips et al.

(10) Patent No.: US 12,124,097 B1
(45) Date of Patent: Oct. 22, 2024

(54) FIBER OPTIC REEL SYSTEM

(71) Applicants: University of Rhode Island Board of Trustees, Kingston, RI (US); Nautilus Defense LLC, Pawtucket, RI (US)

(72) Inventors: Brennan T. Phillips, Wakefield, RI (US); James B. Owens, Jr., Lincoln, RI (US)

(73) Assignees: University of Rhode Island Board of Trustees, Kingston, RI (US); Nautilus Defense LLC, Pawtucket, RI (US)

( * ) Notice: Subject to any disclaimer, the term of this patent is extended or adjusted under 35 U.S.C. 154(b) by 116 days.

(21) Appl. No.: 17/677,651

(22) Filed: Feb. 22, 2022

Related U.S. Application Data

(60) Provisional application No. 63/151,176, filed on Feb. 19, 2021.

(51) Int. Cl.
 *G02B 6/44* (2006.01)
 *G02B 6/38* (2006.01)
 *B33Y 80/00* (2015.01)

(52) U.S. Cl.
 CPC ......... *G02B 6/4427* (2013.01); *G02B 6/3816* (2013.01); *B33Y 80/00* (2014.12)

(58) Field of Classification Search
 CPC .............................. G02B 6/3816; G02B 6/506
 See application file for complete search history.

(56) References Cited

U.S. PATENT DOCUMENTS

| | | | | |
|---|---|---|---|---|
| 5,463,711 A | * | 10/1995 | Chu | G02B 6/4416 385/101 |
| 6,888,972 B2 | * | 5/2005 | Berg | G01V 11/00 385/12 |
| 8,768,126 B2 | * | 7/2014 | Anelli | C23F 13/04 385/109 |
| 10,173,381 B2 | * | 1/2019 | Xia | B29C 48/154 |
| 10,338,336 B1 | * | 7/2019 | Taverner | G02B 6/44382 |

(Continued)

OTHER PUBLICATIONS

Aoki, T., et al., "Development of deep sea free swimming Rov "UROV7K"", Oceans '99 MTS/IEEE, Riding the Crest into the 21st Century. Conference and Exhibition. Conference Proceedings (IEEE Cat. No. 99CH37008), vol. 3, Sep. 1999, 1307-1311.

(Continued)

*Primary Examiner* — Rhonda S Peace
(74) *Attorney, Agent, or Firm* — Philip D. Askenazy; Peacock Law P.C.

(57) ABSTRACT

Systems and methods for tethering a fiber optic cable to an apparatus such as an unmanned underwater vehicle (UUV) or remotely operated vehicle (ROV). The cable is a bare or tight-buffered optical fiber surrounded by a braided sheath, and is constructed so that loads experienced by the cable are not transferred from the sheath to the optical fiber. This construction enables the cable to have good tensile strength but be sufficiently lightweight so that a commercial fishing reel or any similarly scaled lightweight/portable winch system can be used, instead of large specialized deployment equipment. A tube is inserted between the sheath and the optical fiber a certain distance from the end of the cable, and then the cable and tube are inserted into a housing which attaches to the apparatus and potted using an epoxy resin.

22 Claims, 12 Drawing Sheets

(56) References Cited

U.S. PATENT DOCUMENTS

| | | | | |
|---|---|---|---|---|
| 11,714,245 | B2* | 8/2023 | Martin Regalado | G01L 1/242 |
| | | | | 385/12 |
| 2004/0165853 | A1* | 8/2004 | Matsueda | G02B 6/4428 |
| | | | | 385/136 |
| 2016/0222736 | A1* | 8/2016 | Varkey | G02B 6/4416 |
| 2023/0160275 | A1* | 5/2023 | Cox | E21B 33/038 |
| | | | | 405/154.1 |

OTHER PUBLICATIONS

Bowen, A. D., et al., "Exploring the deepest depths: Preliminary design of a novel light-tethered hybrid ROV for global science in extreme environments", Marine Technology Society Journal, vol. 38, No. 2, 2004, 92-101.

Bowen, A. D., et al., "The Nereus hybrid underwater robotic vehicle for global ocean science operations to 11,000 m depth", Proceedings of IEEE Oceans 2008, Sep. 2008, 1-10.

Butler, B. , et al., "Theseus: a cable-laying AUV", Proceedings of Oceans '93 [Abstract only], Oct. 1993, 1210-1213.

Cortland , "Ruggedized Optical Cable (ROC(R))", https://pdf.nauticexpo.com/pdf/cortland/sales-brochures-tech-data-sheets-ruggedized-optical-cable-roc/44268-44163.html, Downloaded Dec. 7, 2022.

Fletcher, B. , et al., "Journey to the challenger deep: 50 years later with the Nereus hybrid remotely operated vehicle", Marine Technology Society Journal, vol. 43, No. 5, 2009, 65-76.

Humphris, S. E., "Vehicles for deep sea exploration", Elements of Physical Oceanography: A Derivative of the Encyclopedia of Ocean Sciences, 2009, 255-266.

Kaartvedt, S. , et al., "Efficient trawl avoidance by mesopelagic fishes causes large underestimation of their biomass", Marine Ecology Progress Series, Vo. 456, 2012, 1-6.

Linden Photonics , "STFOC Optical Cable", Spec sheet, Dec. 30, 2021.

Phillips, B. T., et al., "DEEPi: A miniaturized, robust, and economical camera and computer system for deep-sea exploration", Deep Sea Research Part 1: Oceanographic Research Papers, vol. 153, 2019, 103136.

Phillips, B. T., et al., "Exploring the 'Sharkcano': Biogeochemical observations of the Kavachi submarine volcano (Solomon Islands)", Oceanography, vol. 29, No. 4, 2016.

Reisenbichler, K. R., et al., "Automating MBARI's midwater time-series video surveys: The transition from ROV to AUV", Oceans 2016 MTS/IEEE Monterey, Sep. 2016, 1-9.

Solifos AG , "BRUauqua(R)", Spec sheet, Oct. 31, 2019.

Tactical Fiber Systems , "TFS DuraTAC® Stainless Steel Armored Tactical Fiber Cable With Reel Terminated with LC, ST, TFS BullsEye™ or TFS Magnum™ Connectors", https://www.tacticalfiber.com/tacticalfiberreel.php, Downloaded Dec. 6, 2022.

Teledyne Oceanscience , "Underway CTD", Spec sheet, Mar. 2015.

Tyler, S. W., "Using distributed temperature sensors to monitor an Antarctic ice shelf and sub-ice-shelf cavity", Journal of Glaciology, vol. 59, No. 215, 2013, 583-591.

Webster, S. E., et al., "Feasibility analysis of an 11,000 m vehicle with a fiber optic microcable link to the surface", Oceans 2003. Celebrating the Past . . . Teaming Toward the Future (IEEE Ca. No. 03CH37492), vol. 5, Sep. 2003, 2469-2474.

Yoerger, D. , et al., "Supervisory control architecture for underwater teleoperation", Proceedings. 1987 IEEE International Conference on Robotics and Automation, vol. 4, Mar. 1987, 2068-2073.

\* cited by examiner

FIBER OPTIC REEL SYSTEM

CROSS-REFERENCE TO RELATED APPLICATIONS

This application claims priority to and the benefit of the filing of U.S. Provisional Patent Application No. 63/151,176, entitled "Fiber Optic Reel System", filed on Feb. 19, 2021, the entirety of which is incorporated herein by reference.

STATEMENT REGARDING FEDERALLY SPONSORED RESEARCH OR DEVELOPMENT

This invention was made with government support under Contract No. N00014-20-1-2238 awarded by the Office of Naval Research. The government has certain rights in the invention.

BACKGROUND OF THE INVENTION

Field of the Invention (Technical Field)

The present invention is related to high bandwidth fiber optic systems for deep sea telemetry.

BACKGROUND ART

Note that the following discussion may refer to a number of publications and references. Discussion of such publications herein is given for more complete background of the scientific principles and is not to be construed as an admission that such publications are prior art for patentability determination purposes.

Human access to the deep-sea is facilitated through a spectrum of platforms such as untethered human-occupied vehicles (HOV's), unmanned underwater vehicles (UUV's), and a wide variety of cabled/tethered systems such as Remotely Operated Vehicles (ROVs) and vertical-profiling or towed instrument arrays. Tethered systems employing fiber optics offer a tremendous advantage due to their ability to transmit large quantities of data, including live video, over great distances with extremely low latency. Modern deep-rated ROVs, towsleds, and sonar systems (>1000 m cable length) almost exclusively employ fiber optics for data transmission, typically via load bearing steel-armored cables that can support lifting and pulling and can include power transmission over copper conductors. The size of these cable spools often dwarf the subsea vehicles themselves, and require large oceanographic-class winches and appropriately-sized support vessels for operation. Existing ruggedized fiber optic cables have relatively large core diameters and are shrouded in either urethane plastic and/or rubber layers, steel windings, or a combination of both. Steel-wound fiber optic cables are very tough and can lift large loads, but they are not very flexible, weigh a lot, and have bulky, large core diameters, preventing their use on a fishing reel or ultra-compact winch system.

Alternatively, Nereid-class ROVs instead rely on battery-powered vehicles and bare optical fiber that is free-spooled at almost zero tension throughout the course of a vehicle deployment. "Hybrid" Nereid-class vehicles, which can operate as both tethered ROVs and untethered UUVs, have demonstrated their efficacy at the deepest depths of the ocean. In these systems a major length of the tether is bare optical fiber (or bare fiber that is coated only with plastic and/or rubber) that is extremely fragile, non-load bearing, and cannot be reused for multiple deployments; the robot is retrieved at the surface as a free-swimming untethered autonomous system.

The scale of an ROV in terms of physical size, mass, and power requirements is a major driver in the overall operating scheme of deep-sea tethered systems. Modern work-class ROVs can weigh several tons and their large diameter steel-reinforced tethers require industrial-scale lifting equipment for launch and recovery. The aforementioned Nereid-class ROV system, while less reliant on a large surface winch, still must include a large battery bank for sustained power and requires the use of a complex tether management system that can allow the bare fiber optic to be unspooled at near-zero tension, with no option for recovery of the deployed fiber optic. Furthermore, steel-reinforced tethers completely enshroud the fiber optic, reducing or eliminating its exposure to the ambient environment (i.e. preventing air and/or water flow through the outer layers), which renders them unusable for fiber optic distributed sensing applications.

SUMMARY OF THE INVENTION (DISCLOSURE OF THE INVENTION)

An embodiment of the present invention is an assembly for attaching a load-bearing fiber optic cable to an apparatus, the assembly comprising a fiber optic cable comprising an optical fiber surrounded by a braided sheath; a housing comprising a channel in which the fiber optic cable is disposed, the housing attachable to an apparatus; and a corrosion-resistant tube inserted between a portion of the optical fiber and a portion of the sheath; wherein at least a portion of the fiber optic cable in the channel is potted in a cured epoxy resin. The optical fiber is preferably bare or tight-buffered. The fiber optic cable is preferably neutrally buoyant. The sheath preferably comprises an water-permeable braid, enabling environmental media surrounding the cable to contact the optical fiber. The sheath preferably comprises an aramid or ultra-high-molecular-weight polyethylene (UHMWPE). The inner diameter of the sheath is preferably greater than the outer diameter of the optical fiber when the fiber optic cable is under compression or tension. The optical fiber is preferably isolated from a load experienced by the fiber optic cable. The sheath preferably comprises a sash braid. The yarns comprising the sheath are preferably interlocked during the braiding process, enabling a diameter of the braid to remain constant when the braid is under tension. The tube preferably comprises stainless steel and is preferably longer than the channel. The opening in the housing at one end of the channel preferably has a diameter smaller than an outer diameter of the fiber optic cable but is large enough to accommodate the tube. A portion of the braided sheath is preferably removed from the optical fiber. The braided sheath is preferably removed from the optical fiber up to approximately 20 cm from one of the ends of the optical fiber. The assembly is preferably reusable using the same fiber optic cable. The assembly is optionally configured for distributed acoustic sensing (DAS) and distributed temperature sensing (DTS). The fiber optic cable preferably comprises a diameter of less than approximately 1000 microns, more preferably less than approximately 750 microns. The housing is preferably 3D printed and preferably comprises a plastic resin. The housing preferably comprises an injection port for inserting the epoxy resin into the channel, thereby surrounding the load-bearing braided sheath and bonding it to the tube and housing.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate the practice of embodiments of the present invention and, together with the description, serve to explain the principles of the invention. The drawings are only for the purpose of illustrating certain embodiments of the invention and are not to be construed as limiting the invention. In the drawings.

DETAILED DESCRIPTION OF EMBODIMENTS OF THE INVENTION

Figure 1A:
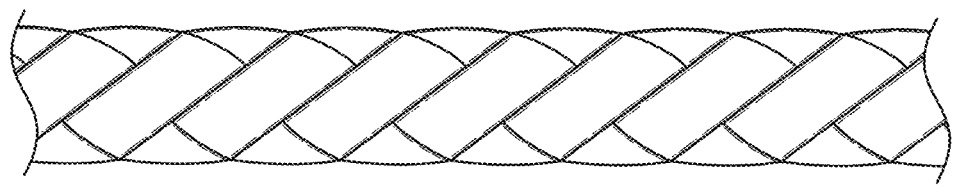
FIG. 1A is a photograph of an embodiment of the fiber optic fishing line cable of the present invention.

An embodiment of the present invention is a customized electric fishing reel, or any similarly scaled lightweight/portable winch system, outfitted with a standard, preferably unbuffered fiber optic cable preferably embedded inside hollow-core braided fishing line or sheath. The preferably neutrally buoyant cable of the present invention offers the abrasion resistance, flexibility and breaking strength (in some embodiments up to about 90 lb or 400 N) of hollow-core braided fishing line in a small diameter (in some embodiments, about 0.4 mm to about 0.8 mm) load-bearing tether, combined with the high-bandwidth remote data transmission telemetry achieved using a fiber optic. It can be spooled onto a small drum and deployed using a small system (i.e. fishing reel or lightweight/portable winch), thereby dramatically reducing the physical scale and operational overhead of tethered live-telemetry deep-sea platforms. Embodiments of the present invention enable the inner bare or, alternatively, tight-buffered optical fiber core to be easily separated from the surrounding braided reinforcement layer, enabling the present mechanical termination design, unlike reinforcement (plastic, rubber, urethane) that is fused or adhered directly to the optical fiber of current cables. Additionally, the preferably water-permeable nature of the braided sheath, such as, but not limited to, an open weave braid, exposes the fiber optic to the surrounding environment, making it useful for fiber optic distributed sensing applications such as distributed acoustic sensing (DAS) and distributed temperature sensing (DTS). The optical fiber can be multimode or single mode. A tight-buffered multimode embodiment of the invention may be better suited for distributed temperature sensing than bare fiber, since it is less sensitive to microbending than bare fiber. The extra jacketing on the cable helps mitigate the interference of light scattering measurements caused by microbends on the fiber. The single mode may be preferable for strain sensing and is preferable for end-to-end data transmission. However, either type may be used for any application of the present invention.

The preferably hollow core braided sheath preferably comprises an aramid such as Kevlar, ultra-high-molecular-weight polyethylene (UHMWPE), or the like, and has a minimum inner diameter when under tension that is greater than the outer diameter of the incorporated fiber optic core so that the core cannot be compressed by the sheath in its jammed state, which is the condition where the angle at which the braid's yarns intersect cannot decrease any further when the braid undergoes axial compression or tension. This reduces or even eliminates mechanical coupling between the fiber optic core and braided sheath during use; thus, compressive forces or loads will not cause the optical fiber to share tensile loads with the outer braid. A sash braid (also known as spiral braid or solid braid) construction is preferably employed to further contribute to the braided sheath's dimensional stability when under tension. The braid inner diameter is preferably slightly larger than the outer diameter of the fiber core to prevent coupling of loads from the braided sheath to the core and maintain a small tether cross section/volume. The sash braid can be easier to manufacture than other braids, but it may not be as strong. The minimum inner diameter of the braid is preferably determined by the size and number of the yarns used and its geometry when in a jammed state. Axial tension is the primary modality of concern in embodiments of the present invention. Some degree of mechanical coupling will still occur due to friction when part of the surface of the core is in physical contact with the braided sheath. This mechanical coupling caused by friction is preferably minimized by using materials with low coefficients of friction, such as UHMWPE fibers. Optimization of the braid preferably maximizes the ideal relationship between stowed volume and deployed length, or packing efficiency, while maintaining the survivability of the optical fiber.

Another embodiment of the present invention is a mechanical termination system, which preferably comprises a 3D-printed housing and stainless steel tube, which is then preferably potted in epoxy. This preferably enables the cable of the present invention to be mechanically attached to a device (a computer, sensor, camera, vehicle, etc.) and loaded with weight without breaking the fiber optic. That is, the termination system is preferably designed to isolate the optical fiber from tensile loading. The epoxy-potted imaging payload preferably includes high-definition video, integrated lighting, rechargeable battery power, and an ethernet-to-fiber converter to achieve bidirectional gigabit telemetry. The system has been deployed to depths exceeding 780 m and can be used to perform repeated deployments and recoveries/retrieval cycles using the same tether, enabled by both the small-diameter load-bearing features of the cable and novel mechanical termination design of the present invention.

Because the cable of the present invention preferably utilizes a single layer of a braided small-diameter outer strength component that is woven directly over the fiber optic without any flexible coating or binding agent, it can be implemented as an extremely small diameter, flexible cable that is compatible with bare or tight-buffered fiber optic cable (250 micron diameter or greater). It also enables a mechanical termination design that is easily assembled and that discretely separates the outer strength member from the fiber optic core. Because the braided outer strength component is preferably water-permeable, enabling the fiber optic to come into direct contact with the surrounding medium, the present invention is suitable for DAS/DTS applications, a state-of-the art method for observing temperature and strain along an optical fiber in high spatiotemporal resolution. For DAS/DTS, any coating or cladding on the actual fiber optic has the potential to attenuate its sensing capability; in some cases, this is an acceptable and necessary tradeoff, but in other applications it may be advantageous to increase sensitivity and optimize time response. Thus the present invention, preferably comprising an uncoated or tight-buffered optical fiber, will provide more accurate readings and faster response time, without sacrificing ruggedized abrasion-resistant construction. A tight-buffered optical fiber preferably desensitizes the core in case there is an unintended load. The present invention can both enable data transmission over long distances (for example, up to 10 km) under tensile loading and also serve as a DAS/DTS sensor with a high response time (for example, from about 30 seconds to 2 min) to changing conditions.

Payloads tethered to the surface using the present invention may also comprise mobility means, transforming the present invention into an extremely compact deepwater ROV system or other deep-sea robotic platforms that involve human-in-the-loop live control and navigation schemes. Deployment platforms such as autonomous surface vehicles (ASVs) and unmanned aerial vehicles (UAVs) may also be enabled for deep-sea exploration by the compact design of the present invention.

Example

Figure 1B:
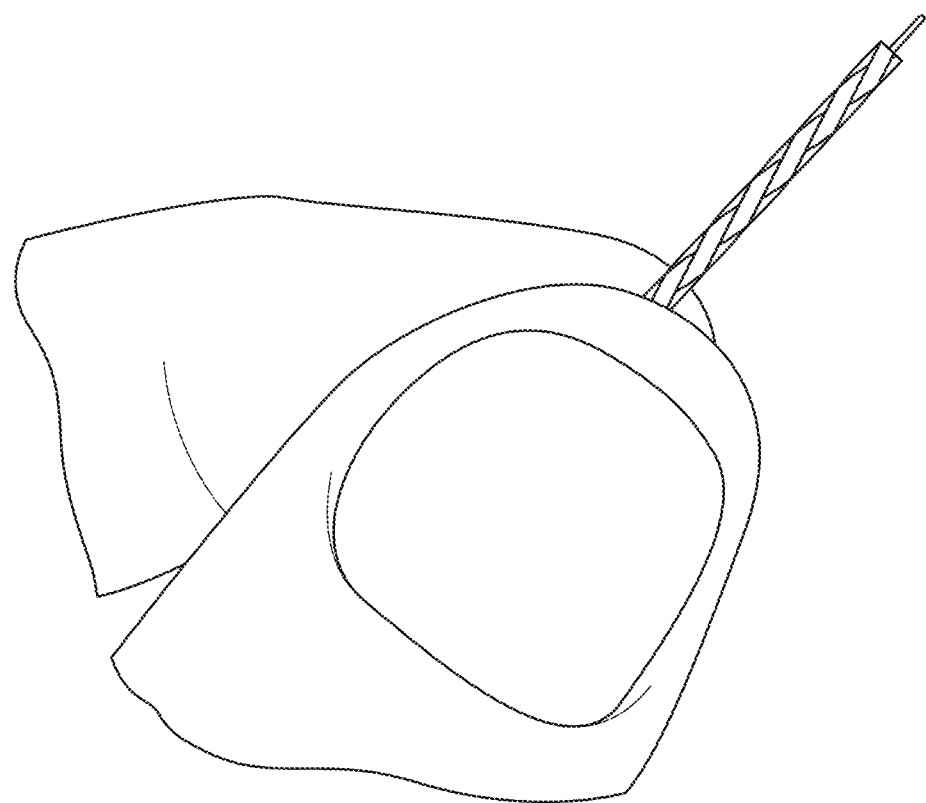
FIG. 1B shows the end of the cable of FIG. 1A stripped, revealing the bare optical fiber.

As shown in FIGS. 1A and 1B, a 750 μm diameter outer sheath for the fiber optic was manufactured from eight 400 denier UHMWPE yarns biaxially braided in a diamond configuration. The inner core comprised a single 125 μm Corning SMF-28e+ bare single mode optical fiber. The maypole braiding machine that was used to manufacture the cable comprised a custom take-up assembly that ensured that the minimum bend radius of the fiber optic core of 16 mm was not exceeded; during manufacture, the fiber optic core never experienced a bend radius greater than 1". The manufacturing method also limited the tension on the fiber optic core throughout manufacturing; that is, the braided sheath was formed under high tension while the fiber optic core is preferably drawn at low tension.

Figure 1C:
FIG. 1C is an embodiment of a cable with a sash braid.

FIG. 1C shows a sash braid comprising twelve 100 denier Dyneema UHMWPE yarns over a single 125 μm Corning SMF-28e+ bare single mode optical fiber core. The yarns of the braided sheath of this construction were interlocked during the braid manufacturing process such that when the braid is under tension its diameter does not change. The inner diameter of this braided sheath was greater than the outer diameter of the fiber optic core.

Figure 2:
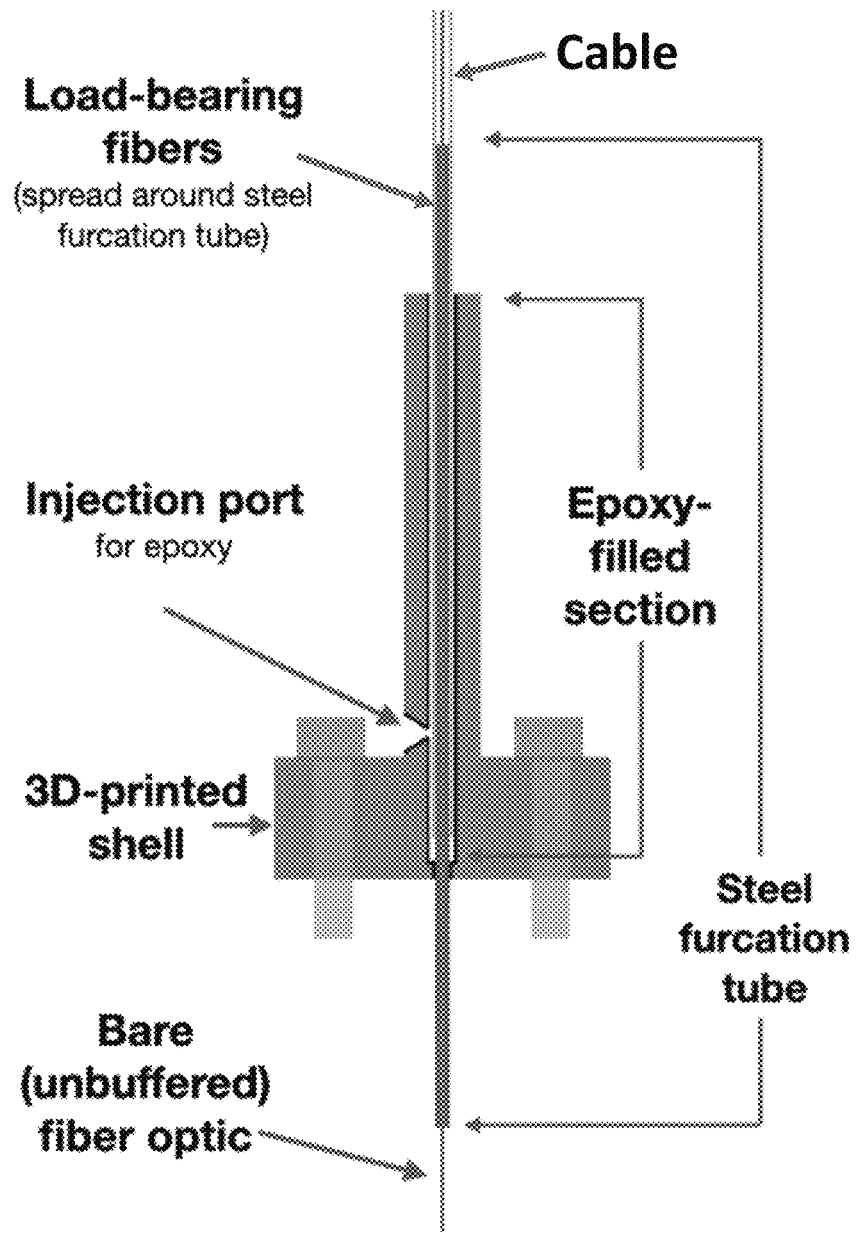
FIG. 2 is a cross-sectional view of an embodiment of the mechanical termination system of the present invention.
Figure 3:
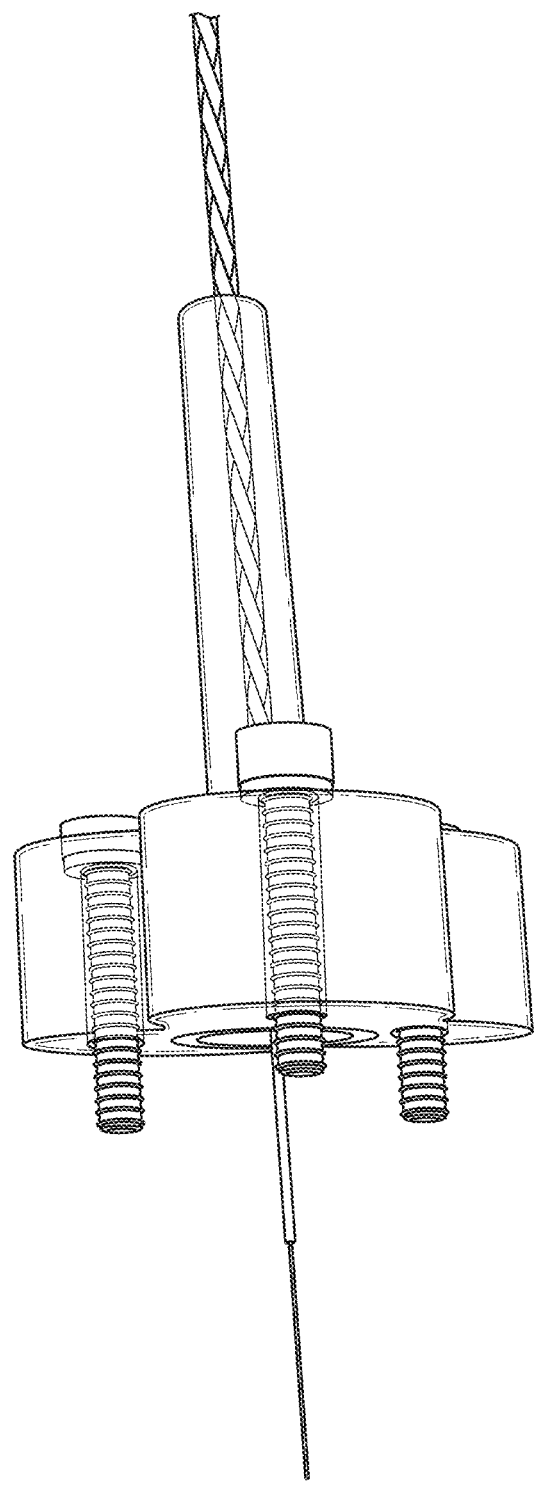
FIG. 3 is a photograph of the mechanical termination system shown in FIG. 2.

A schematic of the mechanical termination is shown in FIGS. 2 and 3. The mechanical termination housing was produced using a Formlabs Form 2/Form 3 stereolithography 3D printer using Standard Clear resin. The epoxy potting compound used inside the termination was Crystal Clear 202 (Reynolds Advanced Materials, USA). The furcation tube was type 304 stainless steel needle tubing (McMaster-Carr, USA).

Figure 4:
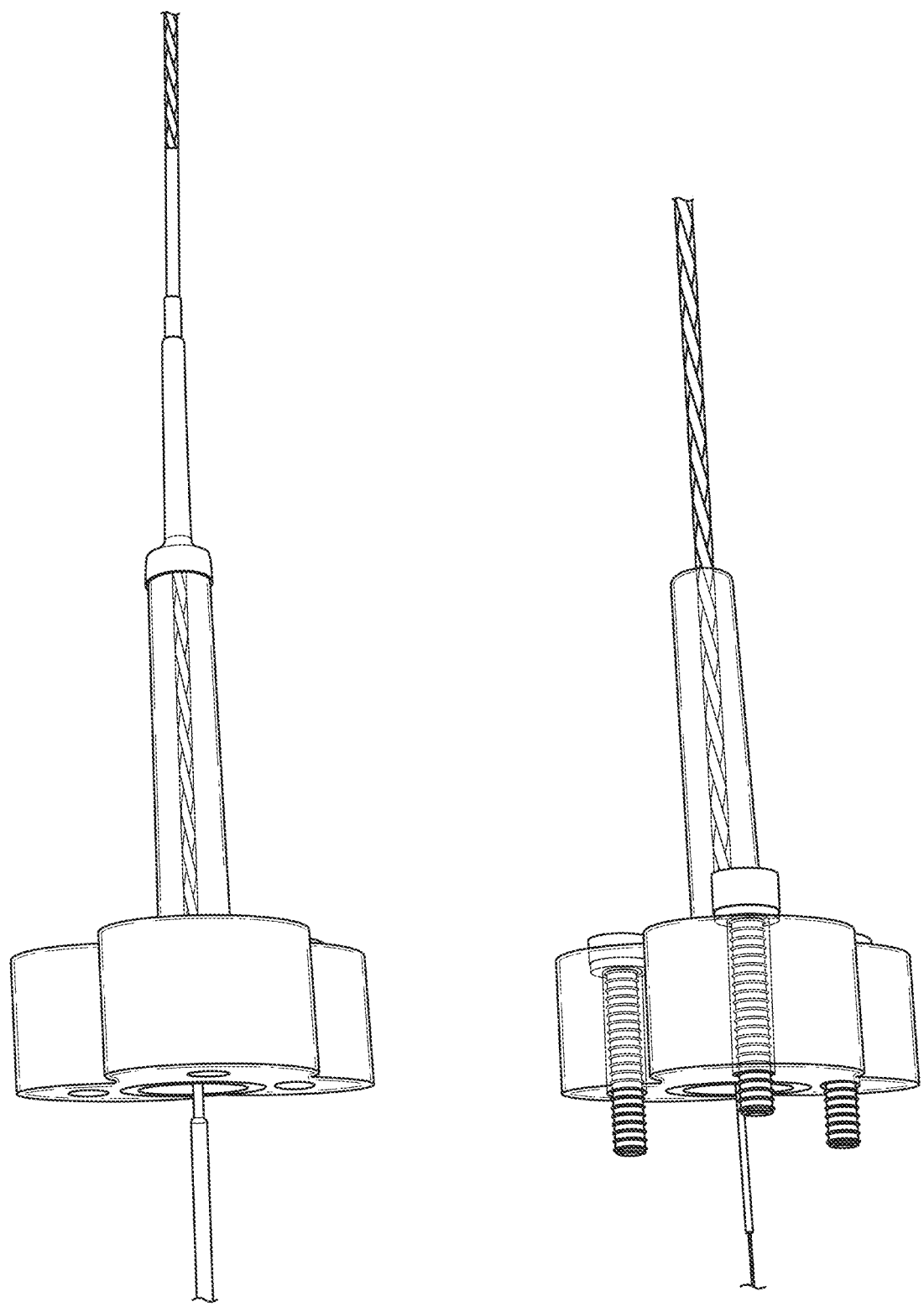
FIG. 4 shows the mechanical termination system before (right side) and after (left side) application of shrink wrapping.

To assemble the termination, the outer braid on the cable was initially trimmed about 20 cm back from the end to expose a usable length of fiber optic, as shown in FIG. 1B. The stainless steel furcation tube (1 mm OD, 0.2 mm wall thickness, 10 cm length) was then inserted over the optical fiber and along the inside of the braid. This assembly was then inserted into the 3D-printed termination piece so that the stainless steel tube passed completely through the piece, and a small amount of hot glue was used to seal the lower-outside portion of the tube against the bottom of the termination piece. Finally, uncured epoxy was injected into the termination piece, filled to the top, and the injection port sealed with electrical tape to prevent the epoxy from flowing back out. Once the epoxy was cured, the cable was fully bonded to the termination piece, while at the same time enabling the fiber optic to move freely inside the stainless steel tube. Several layers of heat shrink wrap were typically used as a bending strain relief at the top of the termination piece, as shown on the left side of FIG. 4.

Tensile testing was performed using a Shimadzu AGS-X 10 kN electromechanical test frame, with reference to ASTM Standard F3410-19 to guide rate and loading procedures, using two double-ended specimens. Two specimens failed at 87 lb (387 N) and 91 lb (404 N), with failure occurring at the entry/exit point into the stainless steel furcation tube. This behavior is expected, as this point in the termination is where the braid sees full tensile loading and the individual fibers are in direct contact with the metal tube edge. Other tensile tests performed on five single-ended FOFL mechanical terminations failed in the 40-75 lb (178-335 N) range, with all failures occurring at the grip point for the cable. Given these results, the mechanical termination itself was determined to be stronger than the cable.

Figure 5A:
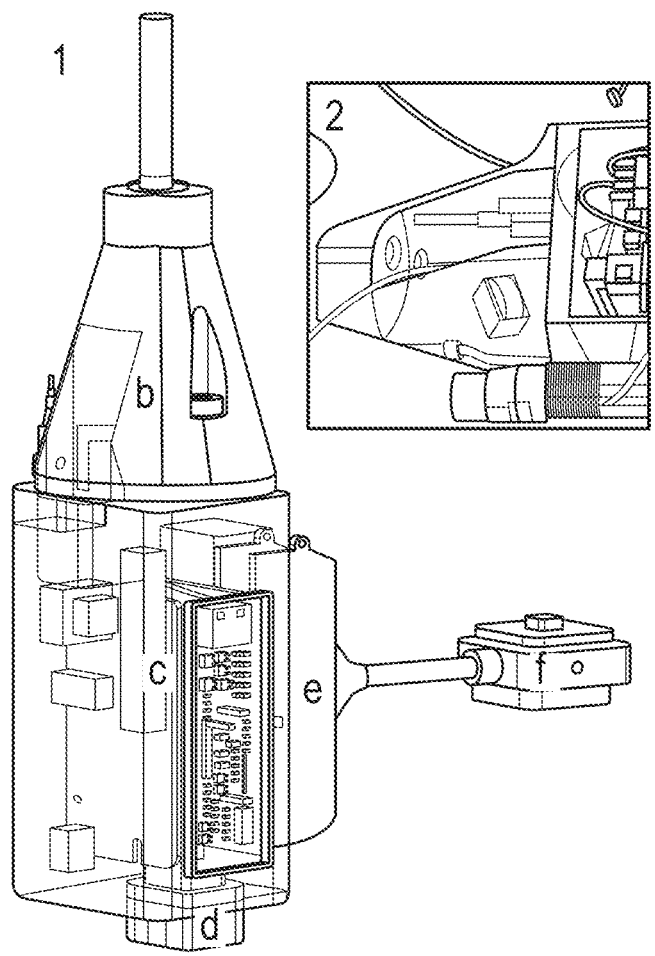
FIG. 5A is a CAD model of the imaging payload of the present invention.
Figure 5B:
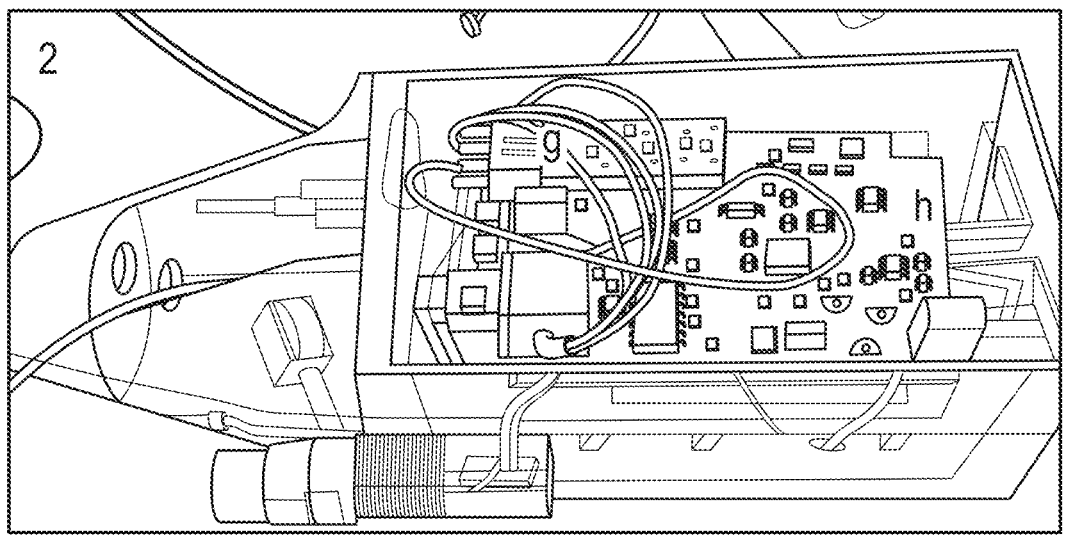
FIG. 5B is a photograph showing a partially assembled imaging payload prepared for epoxy potting.
Figure 5C:
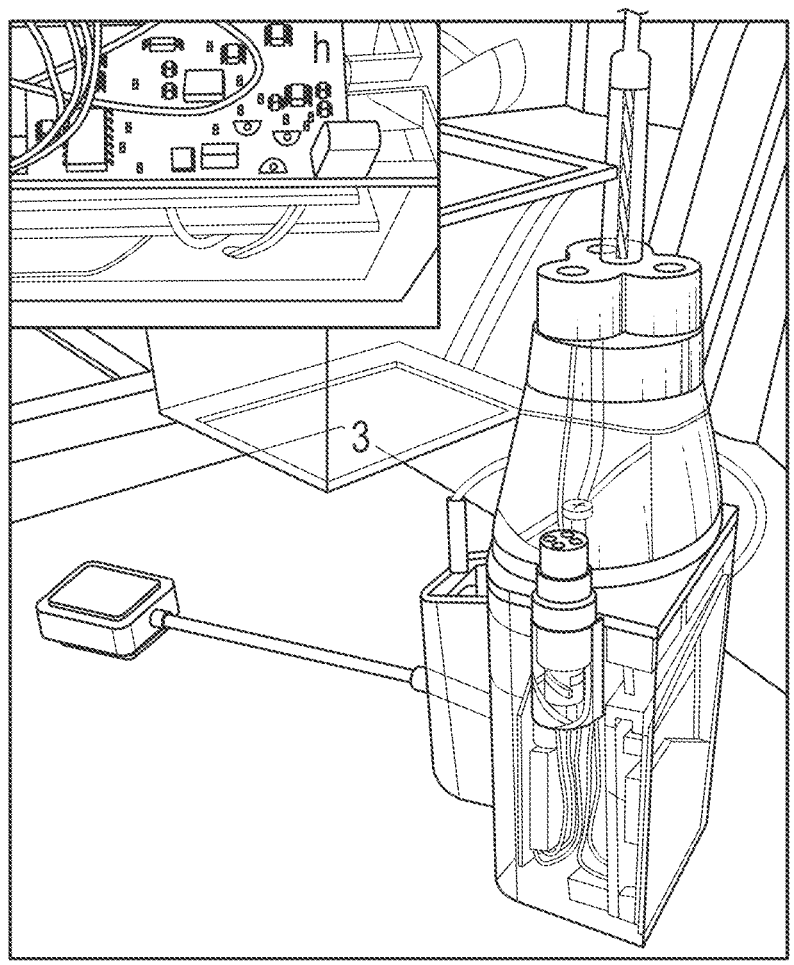
FIG. 5C is a photograph showing the completed imaging payload prototype used in this study.
Figure 6A:
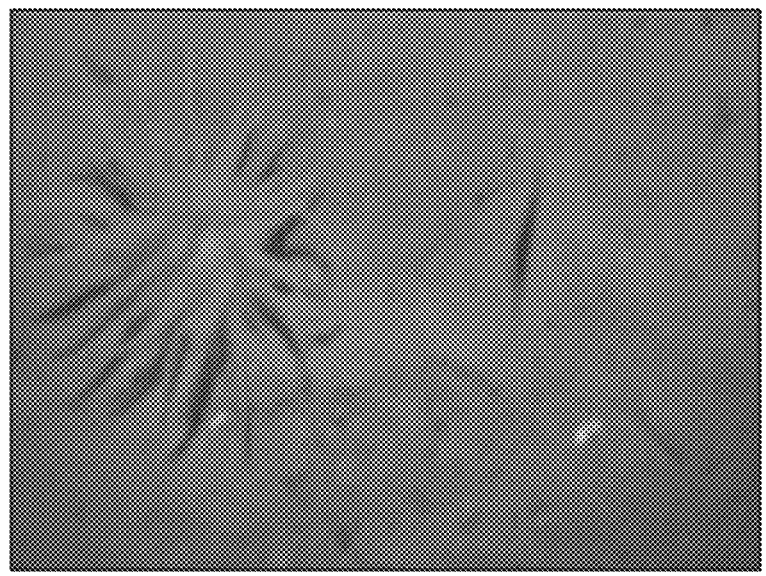
FIG. 6A is a screenshot of a live video stream from approximately 350 m in the Atlantis Canyon in August 2020, including control GUI running on a Google Chrome browser window.
Figure 6B:
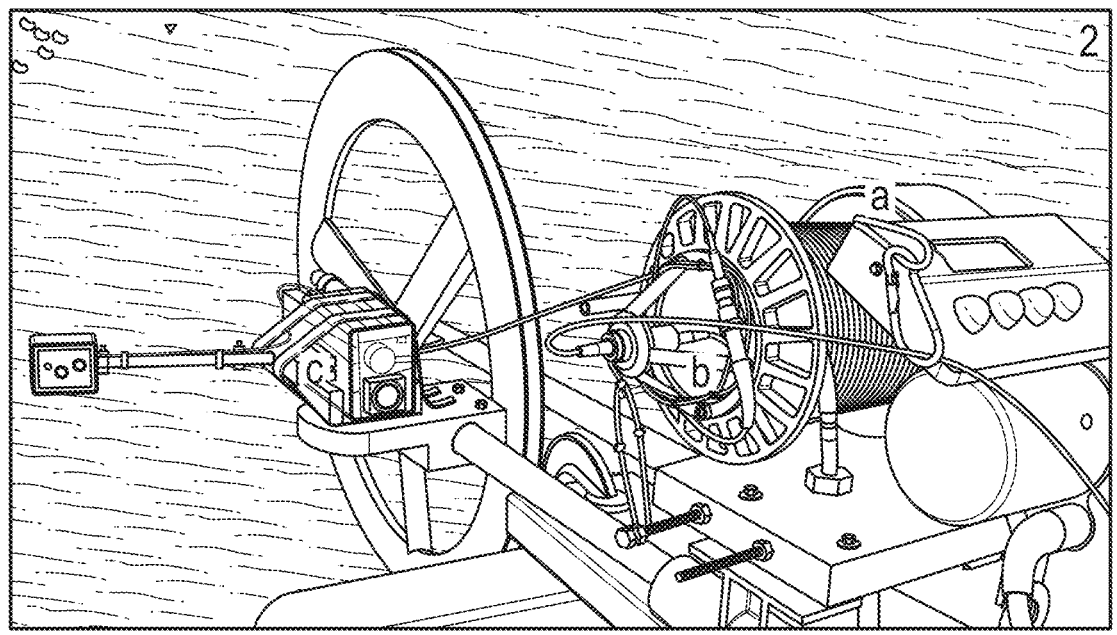
FIG. 6B is a photograph showing the reel system of the present invention mounted on the transom of a 31' center console fishing vessel, used for the Atlantis Canyon deepwater field trials.
Figure 6C:
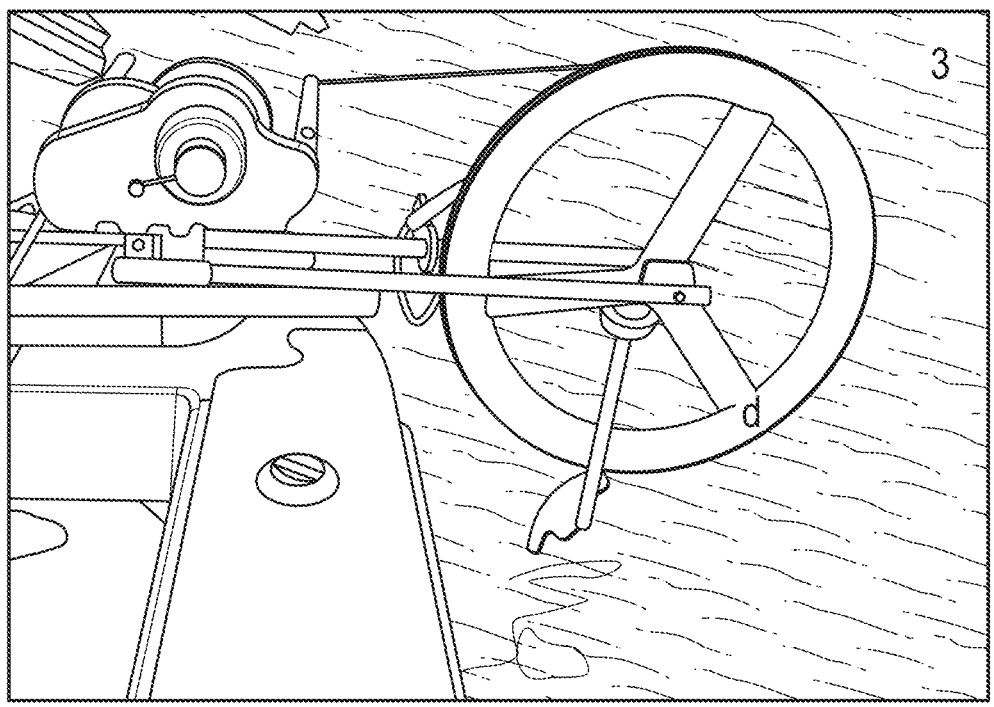
FIG. 6C is a side view of the reel system mid-deployment.
Figure 6D:
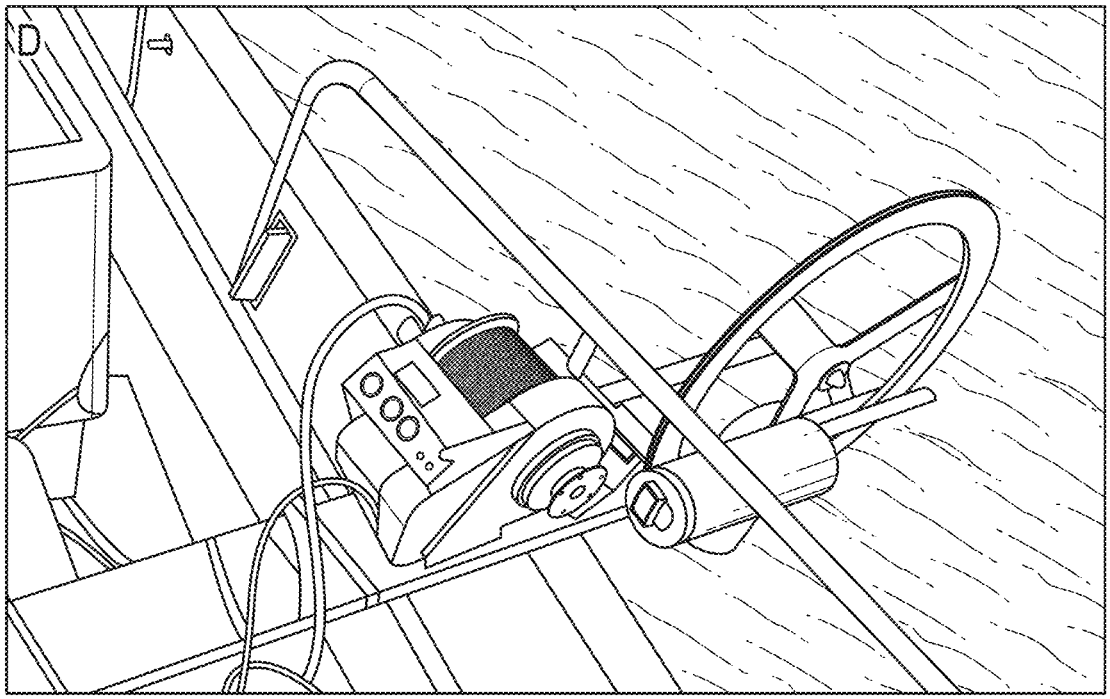
FIG. 6D is a top view of the reel system.
Figure 6E:
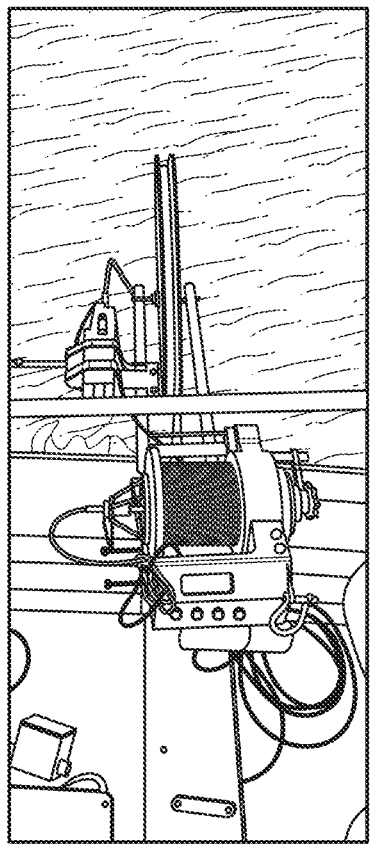
FIG. 6E is a rear view of the reel system.
Figure 6F:
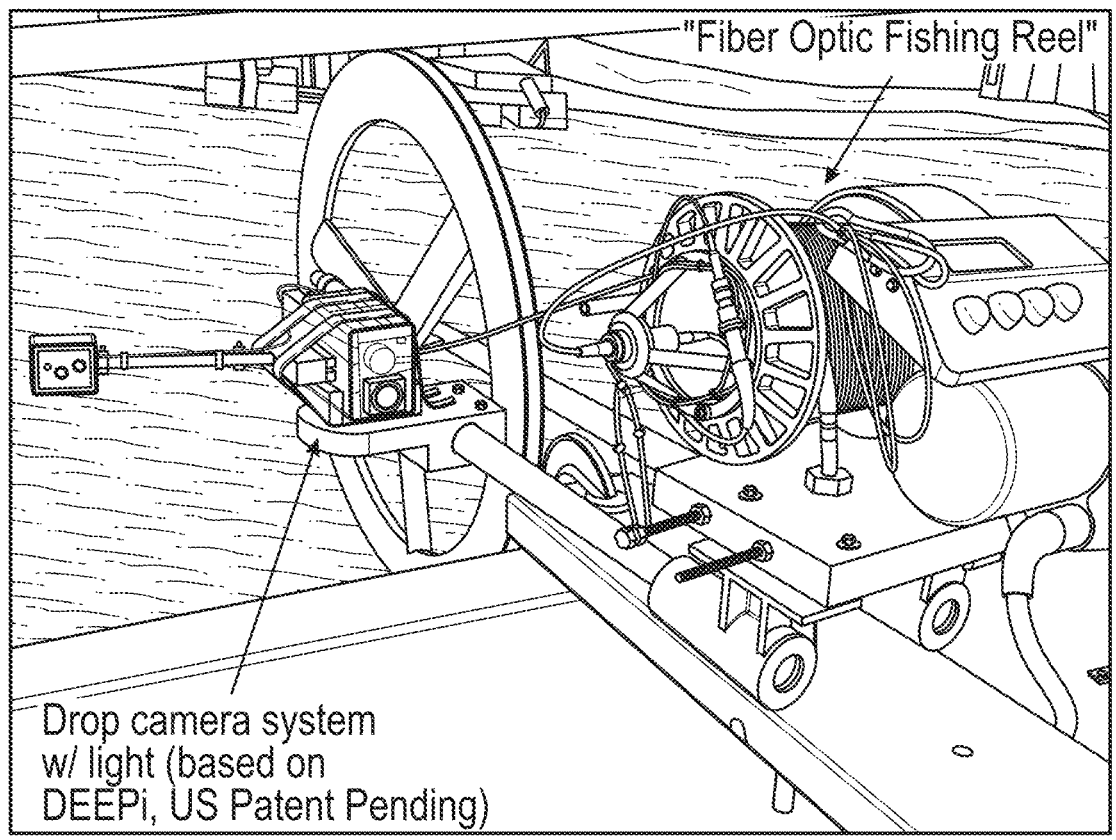
FIG. 6F is an alternative view of FIG. 6B.

As shown in FIGS. 5A-5C, the imaging payload comprised several electronic components mounted inside a 3D-printed mold and potted in rigid fast-cure epoxy. The imaging payload comprised (a) the mechanical termination of the present invention as shown in FIG. 2; (b) a water-flooded fiber optic junction box and removable cover; (c) a potted electronics module with Raspberry Pi 4 B+ computer/microcontroller with 2 GB RAM and a 256 GB microSD card, a rechargeable 4400 mAh 3.7V Li ion battery pack comprising two 18650 cells (Adafruit, USA), and a 10Gtek 1.25G outfitted fiber optic to ethernet media converter with a bidirectional 1510 nm SFP transceiver module; (d) a Raspberry Pi Camera Module V2 imaging sensor/head, described more fully in U.S. patent application Ser. No. 16/920,577, entitled "Miniaturized Underwater Camera and Computer System", incorporated herein by reference; (e) a modular fin with removeable depth/temperature data logger; (f) a potted 450 lumen Actik Core LED headlamp (Petzl America, USA); (g) a modified small form-factor pluggable (SFP) laser module; and (h) a stacked electronics assembly on a 3D-printed internal chassis. Battery charging was achieved using a MacArtney/Subconn MCBH4F bulkhead connector.

The chassis and housing were produced using a Formlabs Form 2/Form 3 stereolithography 3D printer using Standard Clear resin. The epoxy potting compound used inside the termination was Crystal Clear 200 and 202 (Reynolds Advanced Materials, USA). The entire electronics assembly was mounted using a 3D-printed scaffold, which was then installed inside an outer 3D-printed mold. A standard 4-pin wet-mate underwater connector was used as a charge plug, as well as a 'power on' switch when two of the pins were shorted using a custom connector. The fiber optic SFP transmitter module could not be potted directly without modification. Prior to epoxy potting, the laser module inside the SFP was coated on the exterior using hot glue. The LC optical connector was also sealed into the laser module by applying a small coat of cyanoacrylate (Loctite 416) to the ceramic ferrule. These steps sealed the optical components during the potting process and created a small air void deep inside the epoxy.

Lighting for the imaging payload was achieved using a potted LED assembly incorporating an off-the-shelf sporting equipment headlamp (450 lumens) for the internal electronics. The momentary switch used to select brightness levels is controlled directly through one of the Raspberry Pi's GPIO pins. Power for the LED assembly was shared with the main battery bus, and a voltage regulator was potted in-line to maintain consistent power to the lighting array. With lighting set at maximum brightness, it was possible for the imaging payload to broadcast and record a video stream for over one hour on a single charge. Recharging of the system was achieved through the wet-mateable connector using a laboratory power supply and external Li-ion charging circuit.

Livestreaming/remote connectivity was achieved using a dynamic web server hosted on the Raspberry Pi. The Raspberry Pi ran the web server using the flask module from Python. This web server serves a single dynamic page consisting of a mjpeg updated from the latest camera frame and buttons which sent a limited number of preset commands to the Raspberry Pi. The frame rate was not set; instead, the mjpeg updated as quickly as the connection allowed. All code used was available as an open-source repositories (https://github.com/uril-group/DEEPi-OS and https://github.com/rshom/DEEPi-BRUV).

Depth, temperature, attitude and compass data were recorded using a Star-Oddi DST Compass Magnetic unit. A Lindgren-Pitman S1200 electric fishing reel was modified as described below. The slipring used on the reel was an RPC series produced by Princetel, Inc. USA. A high-capacity electric fishing reel (Lindgren-Pitman, S1200 model) was modified to accommodate the cable, large-diameter overboarding sheave, and imaging payload, as shown in FIGS. 6A-6F, comprising (a) the modified commercial off-the-shelf electric fishing reel; (b) the fiber optic slip ring and custom 3D-printed mount; (c) the imaging payload, prepared for deployment, and (d) a carbon fiber wheel used to increase the bending radius of the overboarding sheave. The cable of the present invention was wound directly onto the reel drum and a drilled hole on the inside allowed for the cable to pass through to the center of the drum. At least 1500 m of cable can fit onto a standard drum for the fishing reel. A compact single mode fiber optic slip ring was mounted on the drum using a custom 3D-printed adapter. In place of a fishing rod, a custom carbon-fiber boom outfitted with a carbon-fiber bicycle wheel was used to increase the bending radius of the FOFL under tension; laboratory tests indicated that the reel drum alone is too small in diameter, causing unacceptably high attenuation levels of the optical signal. A single 12V lead-acid car battery was used to power the reel; the battery holds enough capacity for multiple full-cast deployments on a single charge. Topside, a fiber-to-ethernet media converter was put directly in-line with a laptop computer to communicate with the payload for livestream video and lighting control throughout the cast.

Four field trials were conducted. Early deployments took place in Narragansett Bay, RI USA, using a 16.5' Boston Whaler center console small boat. The first deployment to approximately 50 m depth took place off Castle Hill Lighthouse on Jul. 3, 2020 (41.476746° N, −71.347733° W) using an early prototype payload; livestream video was achieved on the downcast, and the optical fiber broke upon retrieval. A similar result, with fiber failure upon retrieval, was achieved using the same vessel in the upper pond of Narrow River (41.500168° N, −71.450029° W) on Jul. 22, 2020.

For the first deepwater test, a 31' center console monohull was used to access Atlantis Canyon (40.026958° N, −70.199236° W) on Aug. 19, 2020. The system of the present invention successfully transmitted live video throughout the cast to an estimated depth of 350 m (based on an acoustic depth sounder) and was retrieved without breaking the optical fiber. Upon reaching the seafloor, live imagery of swarms of euphausiid shrimp, anemones, benthic fish, and other biology was viewed and recorded, including flashes of bioluminescence. The operator raised and lowered the payload based on visual feedback from the livestream output, similar to how a standard towed underwater vehicle can be operated.

Figure 7:
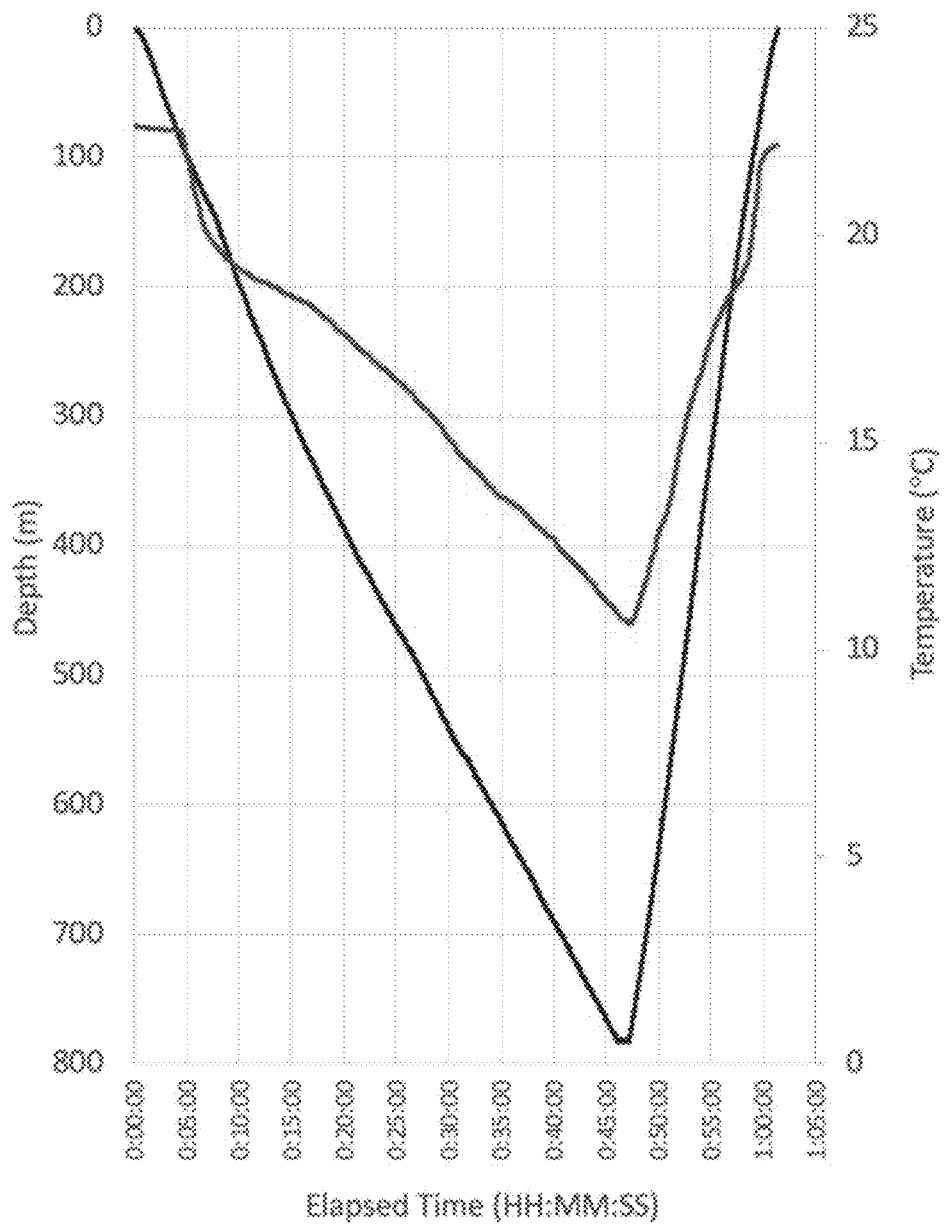
FIG. 7 shows imaging payload depth and temperature profiles from deepwater deployment in Bermuda.
Figure 8:
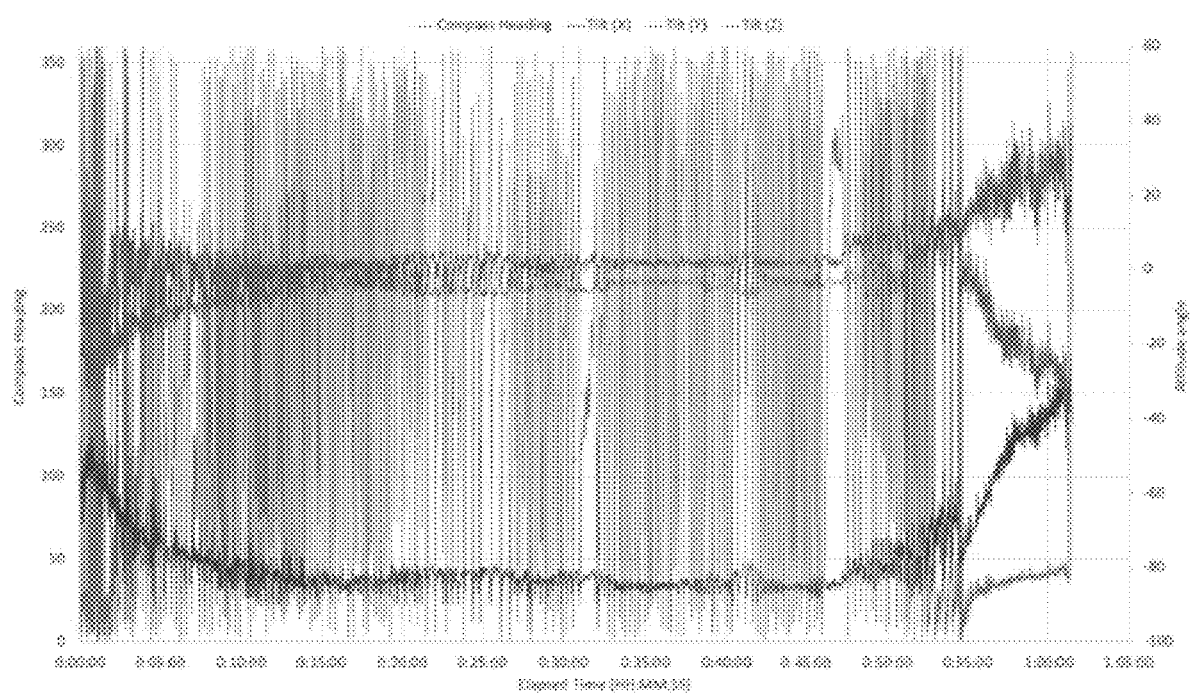
FIG. 8 shows imaging payload attitude and compass direction during deepwater deployment in Bermuda.

The second deepwater test of FOReeIS took place on Dec. 11, 2020 on the NE edge of Bermuda (32.354622° N, −64.547669° W) to a depth of 780 m using the 41' R/V Henry Stommel. This cast took place in open deep water, and the payload was intentionally lowered to the fullest extent of the FOFL that was loaded on the reel (approximately 1500 m) while the vessel drifted along with the surface current at ~0.7 knots (0.36 m/s). A self-logging temperature/depth/3-axis tilt and compass sensor (Star-Oddi, DST Compass Magnetic) was attached to the payload and used to record the dive profile, shown in FIG. 7. Several interesting characteristics of the cast were observed using the data logger. By freespooling the payload for deployment (reel drag set to 0), it took a total of 46 minutes for the payload to reach the maximum depth of 780 m, corresponding with a consistent descent rate of 17 m/min. The upcast speed was much faster when powered by the reel, with an ascent rate of 41.8 m/min. The imaging payload spun in circles in mostly one direction throughout the descent, but maintained a consistent heading during recovery, as shown in FIG. 8. While little biology was observed during this cast, video was livestreamed throughout the deployment and the payload was again retrieved without breaking the FOFL.

Note that in the specification and claims, "about" or "approximately" means within twenty percent (20%) of the numerical amount cited. As used herein, the singular forms "a," "an," and "the" include plural referents unless the context clearly dictates otherwise. Thus, for example, reference to "a functional group" refers to one or more functional groups, and reference to "the method" includes reference to equivalent steps and methods that would be understood and appreciated by those skilled in the art, and so forth.

Although the invention has been described in detail with particular reference to the disclosed embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

What is claimed is:

1. An assembly for attaching a load-bearing fiber optic cable to an apparatus, the assembly comprising:
   a fiber optic cable comprising an optical fiber surrounded by an outer braided sheath;
   a separate housing comprising a channel in which only a portion of the fiber optic cable is disposed, the housing attachable to an apparatus; and
   a corrosion-resistant tube inserted between a portion of the optical fiber and a portion of the sheath, the optical fiber movable within the corrosion-resistant tube;
   wherein at least a portion of the fiber optic cable in the channel is potted in a cured epoxy resin.

2. The assembly of claim 1 wherein the optical fiber is bare.

3. The assembly of claim 1 wherein the optical fiber is tight-buffered.

4. The assembly of claim 1 wherein the fiber optic cable is neutrally buoyant.

5. The assembly of claim 1 wherein the sheath comprises a water-permeable braid.

6. The assembly of claim 5 wherein the water-permeable braid enables environmental media surrounding the cable to contact the optical fiber.

7. The assembly of claim 1 wherein the sheath comprises an aramid or ultra-high-molecular-weight polyethylene (UHMWPE).

8. The assembly of claim 1 wherein an inner diameter of the sheath is greater than an outer diameter of the optical fiber when the fiber optic cable is under compression or tension.

9. The assembly of claim 8 wherein the optical fiber is isolated from a load experienced by the fiber optic cable.

10. The assembly of claim 1 wherein the sheath comprises a sash braid.

11. The assembly of claim 1 wherein yarns comprising the sheath were interlocked during the braiding process, enabling a diameter of the braid to remain constant when the braid is under tension.

12. The assembly of claim 1 wherein the tube comprises stainless steel.

13. The assembly of claim 1 wherein the tube is longer than the channel.

14. The assembly of claim 1 wherein a first opening in the housing at one end of the channel has a diameter smaller than an outer diameter of the fiber optic cable but is large enough to accommodate the tube.

15. The assembly of claim 1 wherein a portion of the braided sheath is removed from the optical fiber.

16. The assembly of claim 15 wherein the braided sheath is removed from the optical fiber up to approximately 20 cm from an end of the optical fiber.

17. The assembly of claim 1 that is reusable using the same fiber optic cable.

18. The assembly of claim 1 configured for distributed acoustic sensing (DAS) and distributed temperature sensing (DTS).

19. The assembly of claim 1 wherein the fiber optic cable comprises a diameter of less than approximately 1000 microns.

20. The assembly of claim 19 wherein the fiber optic cable comprises a diameter of less than approximately 750 microns.

21. The assembly of claim 1 wherein the housing is 3D printed and comprises a plastic resin.

22. The assembly of claim 1 wherein the housing comprises an injection port for inserting the epoxy resin into the channel, thereby surrounding the sheath and bonding it to the tube and housing.

* * * * *